United States Patent [19]
Walker, Jr. et al.

[11] 3,965,399
[45] June 22, 1976

[54] PUSHBUTTON CAPACITIVE TRANSDUCER

[76] Inventors: Frank A. Walker, Jr.; John B. Shevlin, both c/o Controls Research Corporation, 2100 S. Fairview, Santa Ana, Calif. 92704

[22] Filed: Mar. 22, 1974

[21] Appl. No.: 453,841

[52] U.S. Cl. .................... 317/249 R; 200/DIG. 1; 340/365 C
[51] Int. Cl.² ........................................... H01G 5/01
[58] Field of Search ....................... 317/246, 249 R; 340/365 C; 174/146; 200/DIG. 1

[56] References Cited
UNITED STATES PATENTS

| | | | |
|---|---|---|---|
| 3,303,263 | 2/1967 | Myers | 174/116 |
| 3,328,653 | 6/1967 | Wolf | 317/246 |
| 3,659,163 | 4/1972 | Borisov | 317/249 R |
| 3,693,059 | 9/1972 | Harris | 317/249 R |
| 3,710,209 | 1/1973 | Webb | 317/249 R |
| 3,797,630 | 3/1974 | Zilkha | 340/365 C |
| 3,900,712 | 8/1975 | Fukao | 317/249 R |

Primary Examiner—E. A. Goldberg

[57] ABSTRACT

An electro-mechanical transducer for use in keyboards and the like which incorporates a capacitance change utilization concept. The transducer includes a plunger assembly reciprocably disposed in a housing therefor, in operative disposition over capacitance forming areas on an insulated substrate. The plunger assembly includes a key button disposed on one end of a shaft, an intermediate flange on the shaft and a flange at the other end of the shaft. The intermediate flange is positioned adjacent a frusto-conical elastomeric return spring and also serves as a resilient stop for the shaft. A compressible foam or sponge-like material having a thin, flexible metalized dielectric material on its lower portion, is mounted on the lower surface of the other flange. Actuation of the shaft downwardly toward the substrate causes the dielectric material to bridge the capacitance forming areas related thereto to cause a change in capacitance and transfer of energy therebetween. The metalized dielectric material is highly flexible to allow it to readily conform to irregularities in the capacitance forming area.

7 Claims, 6 Drawing Figures

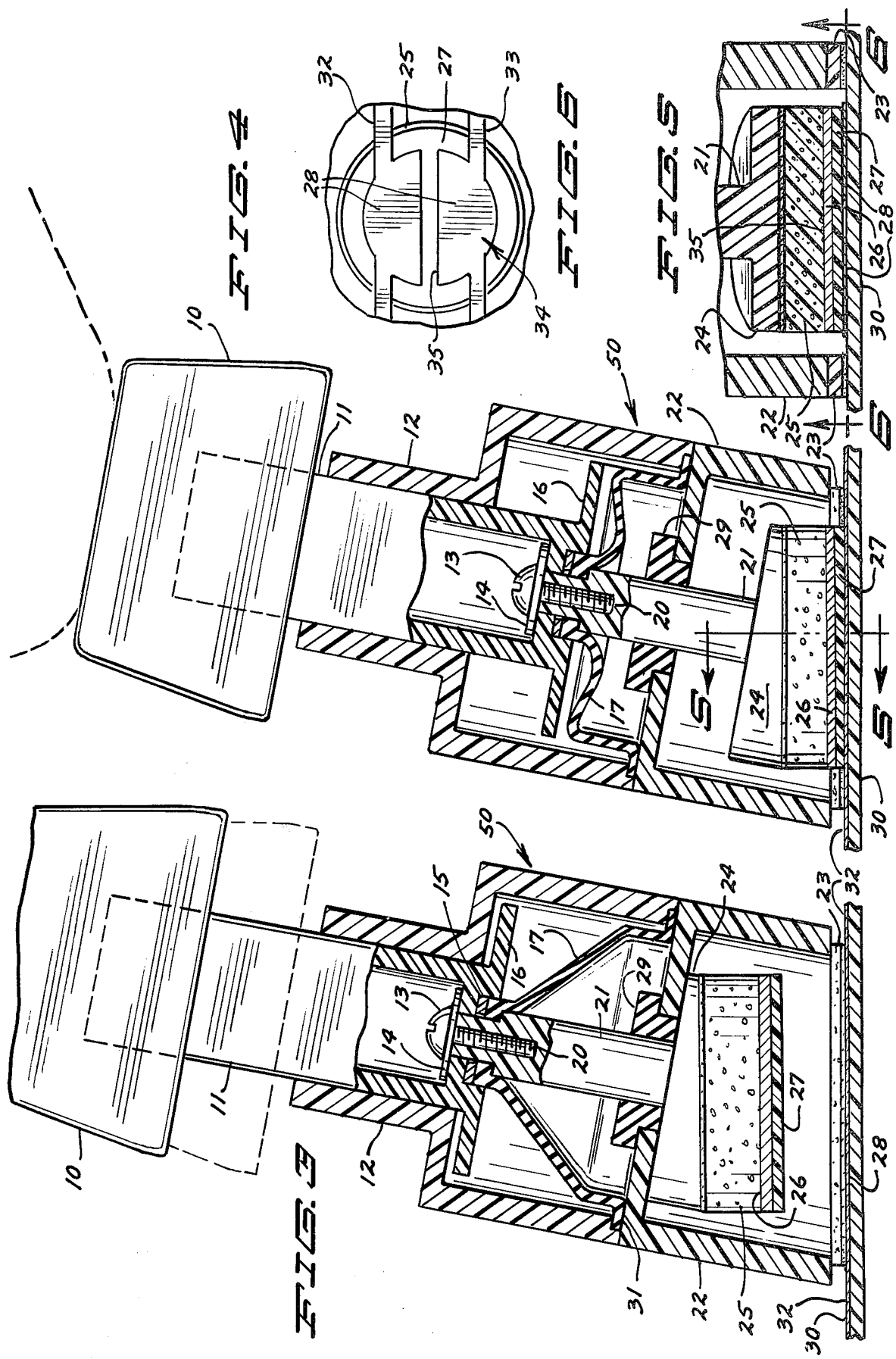

PUSHBUTTON CAPACITIVE TRANSDUCER

BACKGROUND OF THE INVENTION

This invention relates generally to electro-mechanical transducers for providing electrical impulses to a signal utilization device upon actuation of the transducer in response to a mechanical force input. When such an apparatus is applied to keyboards, for example, it is desirable to have apparatus in which a uniform signal output occurs when a keyboard transducer is actuated from one position, or state, to another. Such uniformity of output signal vastly reduces the possibility of errors arising when operating signal utilization devices which may be controlled by a keyboard or the like. In capacitance-type transducing apparatus, the problem may be more critical than that previously encountered in mechanical electrical contact devices, although those skilled in the art may understand that considerable effort has been directed toward the development and evolution of reliable consistent transducers for converting mechanical inputs to electrical, or like signals.

Such prior art devices have also attempted to provide a tactile feel when mechanical motion is applied to the transducers to cause a change from one state to another to enable an operator to feel "comfortable" in all substantial respects when operating the same, such as in a numerical or alphabetical keyboard which may be utilized to originate electrical signals related to information to be processed in computers and the like.

It is therefore an object of our invention to provide improved transducing apparatus for converting mechanical motion into a utilizable signal in an economical manner which will satisfy human environmental factors and provide a consistent, uniform output signal to a signal utilization means.

SUMMARY OF THE INVENTION

Briefly, our invention provides a transducer which translates a mechanical force to a uniform electrical impulse for use by a signal utilization device or means. This is accomplished by providing a capacitance forming member comprised of two spaced apart elements on an insulated substrate and detecting the change in capacitance across the elements when the dielectric gap therebetween is changed.

In such a transducer incorporating the principles of our invention, a flexible member comprised of a conductive film and a dielectric layer is disposed on a resilient backing and adapted to be biased against the capacitance forming member. A substantial change in capacitance between the members is effected when the thin dielectric material is disposed across a gap between the capacitance forming member. In order to provide a consistent change in capacitance, a gap of uniform width is preferably maintained. This is provided by the use of a resilient backing which causes the flexible metallic and dielectric films to conform to surface irregularities of the capacitance forming member and its two elements.

The resilient backing for the flexible film is disposed on the end of a shaft which in turn has a key attached to its other end for providing linear mechanical displacements to dispose the flexible film from a position in contact with the capacitance forming member to a position substantially out of contact to thereby vary the capacitance between the elements of the capacitance forming member.

The shaft upon which the flexible film and key are disposed is biased toward deactuated position of non-contact with the capacitance forming member through the use of a frusto-conical biasing means comprised of elastomeric material which not only serves to maintain the shaft in a deactuated position at which it will "float" but also to provide a form of snap action in its biasing force from a position of biasing the shaft outwardly away from the capacitance forming member to a position which will allow full actuation and depression of the key, shaft backing and flexible films into firm contact with the capacitance forming member whereat the resilient backing disposed intermediate the flexible films and the end of the shaft serves to provide for a substantial overtravel of the shaft so as to provide a resilient stop therefor in addition to the resilient stop which is provided by an intermediate flange on the shaft adapted to engage the sides of the elastomeric frusto-conical biasing member when the shaft is in an actuated position.

It may therefore be seen that the uncomplicated apparatus of our transducer provides a device which may be incorporated into a keyboard assembly, or the like, which provides a familiar "feel" for an operator and which provides a uniform, consistent and reliable output signal in an economical manner.

BRIEF DESCRIPTION OF THE DRAWINGS

FIG. 3 is a fragmentary sectional view taken along section line 3—3 on FIG. 1 showing the transducer in an unactuated position;

FIG. 4 is an enlarged fragmentary sectional view taken along section line 4—4 on FIG. 1 of the drawings illustrating the transducer in an actuated position;

FIG. 5 is a fragmentary sectional view taken along section line 5—5 on FIG. 4 of the drawings; and FIG. 6 is a fragmentary sectional view taken along section line 6—6 on FIG. 5.

DESCRIPTION OF THE PREFERRED EMBODIMENT

Figure 1:
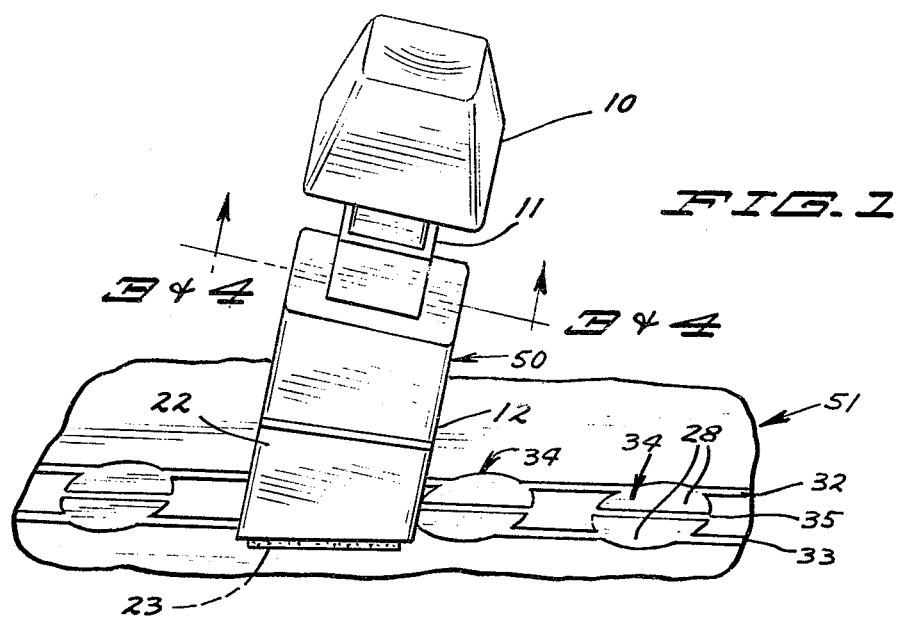
FIG. 1 is a side perspective fragmentary view of a portion of a keyboard assembly incorporating the principles of our invention.
Figure 2:
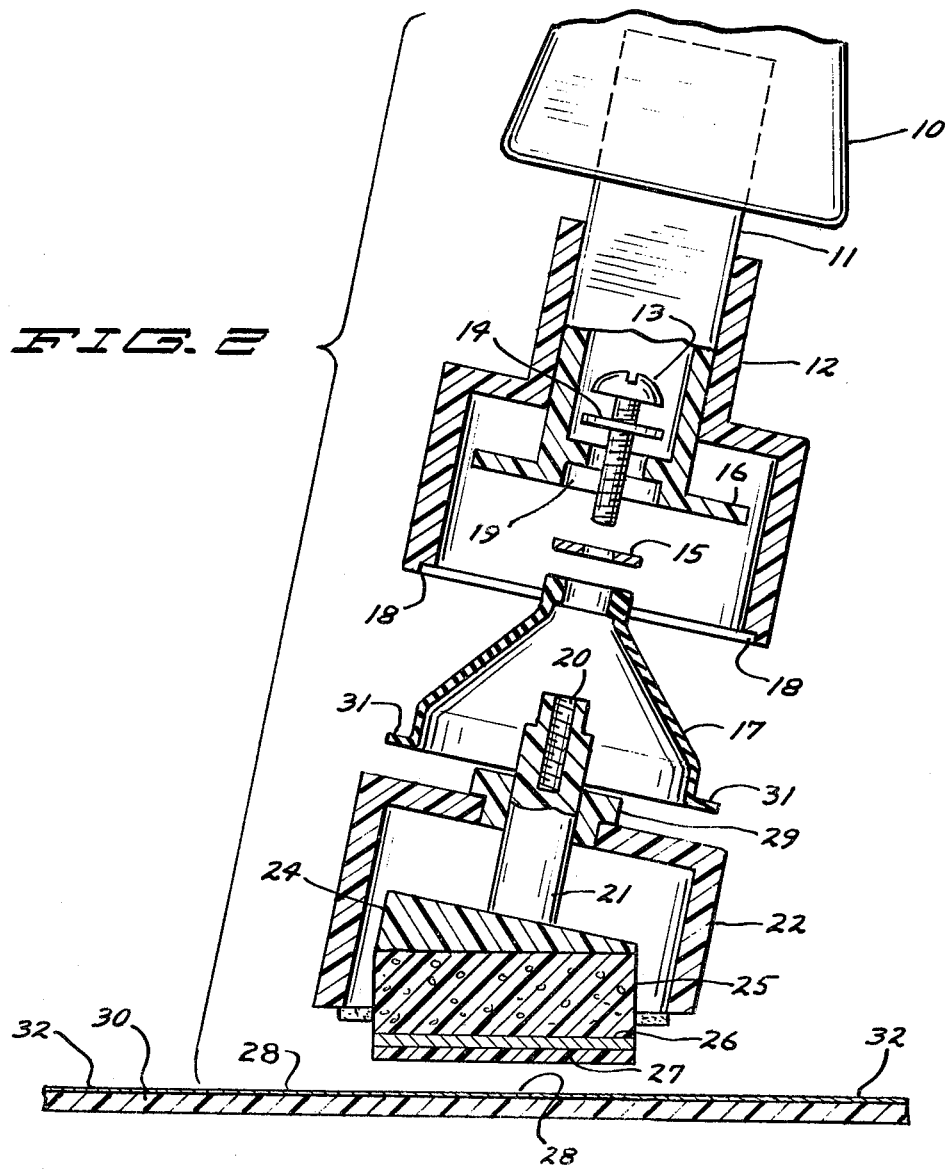
FIG. 2 is an enlarged sectional view of the apparatus of FIG. 2, partly in section.

Referring now to FIGS. 1–6 of the drawings, a transducer assembly, indicated generally by reference character 50, is shown mounted upon an insulating base or substrate 51, which may be comprised of suitable insulating material such as is found on printed circuit cards and the like.

Transducer 50 includes a key button 10 that is affixed to the top end of an upper operating shaft 11. Upper operating shaft 11 is reciprocably disposed in a complementary shaped aperture extending through the top of an upper housing 12. A radially outwardly extending flange is disposed with upper housing 12 and extends from the lower end of upper operating shaft 11. While not shown in the drawings, the interior chamber and the aperture at the top of upper housing 12 may be cylindrical in configuration as well as the nonsymmetrical shape illustrated in FIG. 1.

A lower operating shaft 21 is shown extending through a guide bushing 29 in the top of lower housing 22. Lower housing 22 is open at its lower end and includes a pair of mounting spacers 23 along the bottom of opposed side edges for purposes to be described below.

An elastomeric biasing and return device 17 having a generally frusto-conical configuration is provided with an outwardly extending flange 31 of complementary shape to a recess 18 disposed around the inner lower periphery of the open ended lower portion of upper housing 12, and an aperture at the top thereof which is disposed on the upper necked down portion of lower shaft 21 beneath a washer 15 disposed in a recess 19 in the lower end of upper shaft 11 and between the main portion of lower shaft 21. A bolt 13 is shown extending through a washer 14 into a threaded aperture 20 in the upper end of lower shaft 21 to thereby directly and firmly interconnect upper shaft 11 to the top of lower shaft 21 and to couple the assembly to the aperture extending through the top smaller end of elastomeric return device 17.

The lower end of operating shaft 21 includes a wedge shaped or flat flange 24 to which is affixed a pad of compressible elastic material such as a spongy plastic foam indicated generally by reference character 25. A flexible film of dielectric material 27 having a top flexible film of conductive material 26 is affixed to the lower surface of compressible pad 25.

Mounting base 51 is shown comprised of a printed circuit board 30 having a pattern of conductors 32 and 33 connected to a plurality of complementary shaped capacitance forming members 34, each comprised of a pair of capacitance forming elements or electrodes of complementary shape, indicated by reference characters 28, which are separated by a substantially uniform gap 35.

As may be seen, the bottom open ended portion of lower housing 22 may be disposed at an angle to mounting base 51 by suitable mounting means, such as spacers 23 and a suitable adhesive material. It may likewise be seen that upper and lower housings 12 and 22 are likewise affixed together and held in such position through the use of suitable adhesive material (not shown). Further, assembly of pad 25 to wedge 24 and assembly of flexible conductive films 26 and 27 to pad 25 may likewise be accomplished through the use of suitable adhesive material as may fall within the realm of the experience of one skilled in the art to which our invention pertains.

It may likewise be seen that the specific configuration of the capacitance forming members 34, the location thereof and the disposition and interrelation of such with respect to conductors 32 and 33 or others (not shown) may be determined by those skilled in the art to which our invention pertains. It need only be stated that conductors 32 and 33, or like conductors may be suitably connected to electrical signal utilization means to render this illustrative embodiment of our invention operative in its intended use as, for example, a keyboard assembly for a typewriter or calculator.

OPERATION

In operation, the transducer 50 is assembled in the manner illustrated in the drawings and disposed in operative relationship upon mounting base 51 through the use of spacers 23 which are firmly affixed to both elements. The pattern of capacitance members 34 including elements 28 and gap 35 and conductors 32 and 33 have previously been deposited or otherwise fashioned upon or in the surface or printed circuit board 30 to comprise mounting base 51.

Transducer 50 is normally in its unactuated position illustrated in FIG. 3 in which the shaft comprised of upper and lower members 11 and 21 is in its uppermost position under the biasing force exerted by return device 17 and in this position it will be noted that there is a spacing effected intermediate flange 16 on the lower end of upper shaft 11 and the interior portion of the chamber defined in the lower part of upper housing 12 to allow a predetermined free movement and in effect a "floating" of the assembly in its unactuated ready position.

As a force is initially applied to the top by the depression of key button 10 by an operator, the shaft assembly will move downwardly and considerable resistance to such movement will be provided by the frusto-conical configuration of elastomeric return device 17. At some point in the downward travel, the resistance is suddenly released and the entire mechanism comprised of key 10, upper shaft 11 and lower shaft 21 may rapidly move downwardly to place dielectric film 27 in contact with the top portions of electrode elements 28 of capacitance forming member 34 thereby forming a bridge across gap 35. As the force exerted on key 10 continues, foam compressible pad 25 is compressed as shown in FIG. 4 substantially at the end of a down stroke or actuation of transducer 50.

The compression of the foam material serves to conform flexible dielectric film 27 and its bridging flexible metallic film 26 into conformance with any irregularities which may exist in the surfaces of capacitance forming member 34 to provide a uniform transfer of energy between elements 28 across gap 35. As pad 25 is continued to be compressed, it forms an increasing resistance to downward travel of the movable portions of transducer 50 and serves to limit all travel in addition to the stop for overtravel which is provided by the interaction of the lower surface of flange 16 on upper shaft 11 and the top surface of the collapsed frusto-conical return device 17 to form a resilient and effective overtravel stop while still allowing the foam pad 25 to maintain its resilient operating characteristics. A comparison of the thickness of pad 25 between FIGS. 3 and 4 of the drawings will indicate the compression thereof which serves to conform the dielectric and metallic film 27 and 26 to the surface of elements 28 of capacitance member 34.

FIGS. 5 and 6 are fragmentary views showing the relationship between the films and the capacitance forming member in an actuated position.

Having now therefore fully illustrated and described our invention, what we claim to be new and desire to protect by Letters Patent is:

1. In a pushbutton transducer of the class above described, the combination comprising:
   a reciprocable shaft including one end adapted to serve as an actuator therefor;
   a resilient pad disposed on the other end of said shaft;
   a pair of conductive electrode members, each having a terminal and being separated by a gap;
   a flexible sheet electrode bridging means deformable across the plane thereof disposed on the end of said pad to be conformly deformed over the opposing surfaces of said electrode members for matingly interfacing a lower surface of said sheet electrode bridging means to said opposing surfaces of said electrode members, said flexible sheet electrode bridging means lower surface deforming to the contour of said opposing surfaces of said electrode members when said shaft is articulated against said electrode members; and biasing means provided to urge the other end of said shaft away from said electrode members.

2. The apparatus of claim 1 in which the flexible bridging means is comprised of an outer flexible sheet of dielectric material and an inner flexible sheet of conductive material.

3. The apparatus of claim 2 in which the shaft is disposed in a housing therefor and the biasing means is disposed in a chamber in said housing.

4. The apparatus of claim 3 in which the shaft includes a radially outwardly extending portion adapted to engage the biasing means and act as a stop therefor.

5. The apparatus of claim 4 in which the biasing means is of frusto-conical shape.

6. The apparatus of claim 1 in which the electrode members are disposed in a plane on a base and the flexible sheet bridging means is of complimentary planform.

7. The apparatus of claim 3 in which the electrode members and the housing are disposed on a base, the pad on the actuator being disposed over the electrode members for motion toward and away therefrom.

* * * * *